United States Patent [19]
Moore

[11] Patent Number: 5,343,319
[45] Date of Patent: Aug. 30, 1994

[54] APPARATUS FOR ADAPTING AN ELECTRICAL COMMUNICATIONS PORT TO AN OPTICAL COMMUNICATIONS PORT

[75] Inventor: Morris A. Moore, Wellington, Fla.
[73] Assignee: Motorola, Inc., Schaumburg, Ill.
[21] Appl. No.: 76,054
[22] Filed: Jun. 14, 1993
[51] Int. Cl.$^5$ .................................. H04B 10/00
[52] U.S. Cl. .................. 359/152; 359/145; 359/174; 455/343
[58] Field of Search .............. 359/145–146, 359/118, 152, 164, 172, 174, 176; 455/38.3, 343

[56] References Cited

U.S. PATENT DOCUMENTS

| | | | |
|---|---|---|---|
| 4,516,221 | 5/1985 | Nakata et al. | 359/172 |
| 4,649,385 | 3/1987 | Aires et al. | 379/57 |
| 4,727,600 | 2/1988 | Avakian | 359/172 |
| 4,804,955 | 2/1989 | Yoshizawa | 340/825.44 |
| 4,825,200 | 4/1989 | Evans et al. | 341/23 |
| 5,218,466 | 6/1993 | Brooks | 359/145 |
| 5,247,380 | 9/1993 | Lee et al. | 359/118 |

OTHER PUBLICATIONS

Personal Computer Memory Card International Association, "PC Card Standard," Release 2.0, U.S.A., Sep., 1991.
Personal Computer Memory Card International Association, "Socket Services Interface Specification," Release 1.01, U.S.A., Sep. 1991.

*Primary Examiner*—Richard E. Chilcot, Jr.
*Assistant Examiner*—Kinfe-Michael Negash
*Attorney, Agent, or Firm*—R. Louis Breeden; Thomas G. Berry

[57] ABSTRACT

An apparatus (100) couples first and second electronic devices (206, 202), the first electronic device (206) having an optical communications port (208) and the second electronic device (202) having an electrical communications port (204). The apparatus (100) includes an electrical interface (102) functionally compatible with the electrical communications port (204), and an optical interface (107) functionally compatible with the optical communications port (208) and electrically coupled to the electrical interface (102) for communicating with the electrical interface (102). The electrical interface (102) and the optical interface (107) provide communications between the electrical communications port (204) and the optical communications port (208) when the electrical interface (102) is electrically coupled to the electrical communications port (204), and the optical interface (107) is optically coupled to the optical communications port (208).

18 Claims, 3 Drawing Sheets

APPARATUS FOR ADAPTING AN ELECTRICAL COMMUNICATIONS PORT TO AN OPTICAL COMMUNICATIONS PORT

FIELD OF THE INVENTION

This invention relates in general to adapters for communication ports, and more specifically to an apparatus for adapting an electrical communications port to an optical communications port.

BACKGROUND OF THE INVENTION

Optical communications ports, e.g., ports equipped with infrared transceivers, are in use today for providing wireless communication links between electronic devices. Such wireless communication links can be utilized, for example, for transferring data between a computer and a keyboard, a printer, an RF modem, or another computer. An advantage of the optical communication link is that a user of an optically linked device has a greater freedom of placement of the device during use because of the elimination of movement-restricting cords. Unfortunately, there has been little if any industry standardization of optical communication ports, causing devices made by one manufacturer to be incompatible with devices made by another manufacturer.

Another type of interface being popularized by personal computer manufacturers is the Personal Computer Memory Card International Association (PCMCIA) interface. This interface is an electrical communications port utilizing a plug-in card format. The PCMCIA interface is an industry-standardized interface, but it requires direct connection of the two communicating devices, either in the form of a cable between the devices, or by virtue of one of the devices being made as a plug-in card in the PCMCIA format. The PCMCIA interface does not support optical communications.

Thus, what is needed is an industry-standardized interface that can support optical communications, thereby providing the placement advantages derived from elimination of wired connections, while maintaining interoperability among devices made by different manufacturers.

SUMMARY OF THE INVENTION

One aspect of the present invention is an apparatus for coupling first and second electronic devices. The first electronic device has an optical communications port and the second electronic device has an electrical communications port. The apparatus comprises an electrical interface functionally compatible with the electrical communications port, and an optical interface functionally compatible with the optical communications port and electrically coupled to the electrical interface for communicating with the electrical interface. The apparatus further comprises a power control element coupled to the electrical interface and to the optical interface. The electrical interface and the optical interface provide communications between the electrical communications port and the optical communications port when the electrical interface is electrically coupled to the electrical communications port, and the optical interface is optically coupled to the optical communications port. The power control element reduces power consumption by the apparatus in response to an absence of communications activity in the electrical interface and in the optical interface. The power control element restores full functional power to the apparatus in response to communications activity in at least one of the electrical interface and the optical interface.

Another aspect of the present invention is an apparatus for coupling first and second electronic devices. The first electronic device has an optical communications port and the second electronic device has a Personal Computer Memory Card International Association (PCMCIA) port. The apparatus comprises a PCMCIA interface functionally compatible with the PCMCIA port, and an optical interface functionally compatible with the optical communications port and electrically coupled to the PCMCIA interface for communicating with the PCMCIA interface. The apparatus further comprises a power control element coupled to the PCMCIA interface and to the optical interface. The PCMCIA interface and the optical interface provide communications between the PCMCIA port and the optical communications port when the PCMCIA interface is electrically coupled to the PCMCIA port, and the optical interface is optically coupled to the optical communications port. The power control element reduces power consumption by the apparatus in response to an absence of communications activity in the PCMCIA interface and in the optical interface. The power control element restores full functional power to the apparatus in response to communications activity in at least one of the PCMCIA interface and the optical interface.

A third aspect of the present invention is an adapter for coupling a radio communication device and a computer. The radio communication device has an optical communications port and the computer has a Personal Computer Memory Card International Association (PCMCIA) port. The adapter comprises a PCMCIA interface functionally compatible with the PCMCIA port, and an optical transceiver functionally compatible with the optical communications port and electrically coupled to the PCMCIA interface for communicating with the PCMCIA interface. The adapter further comprises a power control element coupled to the PCMCIA interface and to the optical transceiver. The PCMCIA interface and the optical transceiver provide communications between the PCMCIA port and the optical communications port when the PCMCIA interface is electrically coupled to the PCMCIA port, and the optical transceiver is optically coupled to the optical communications port. The power control element reduces power consumption by the adapter in response to an absence of communications activity in the PCMCIA interface and in the optical transceiver. The power control element restores full functional power to the adapter in response to communications activity in at least one of the PCMCIA interface and the optical transceiver.

A fourth aspect of the present invention is a communication system, comprising a first electronic device having an optical communications port, and a second electronic device having an electrical communications port. The communication system further comprises an apparatus for coupling the first and second electronic devices. The apparatus comprises an electrical interface functionally compatible with the electrical communications port, and an optical interface functionally compatible with the optical communications port and electrically coupled to the electrical interface for communicating with the electrical interface. The apparatus further comprises a power control element coupled to the electrical interface and to the optical interface. The electrical interface and the optical interface provide communications between the electrical communications port and the optical communications port when the electrical interface is electrically coupled to the electrical communications port, and the optical interface is optically coupled to the optical communications port. The power control element reduces power consumption by the apparatus in response to an absence of communications activity in the electrical interface and in the optical interface. The power control element restores full functional power to the apparatus in response to communications activity in at least one of the electrical interface and the optical interface.

DESCRIPTION OF THE PREFERRED EMBODIMENT

Figure 1:
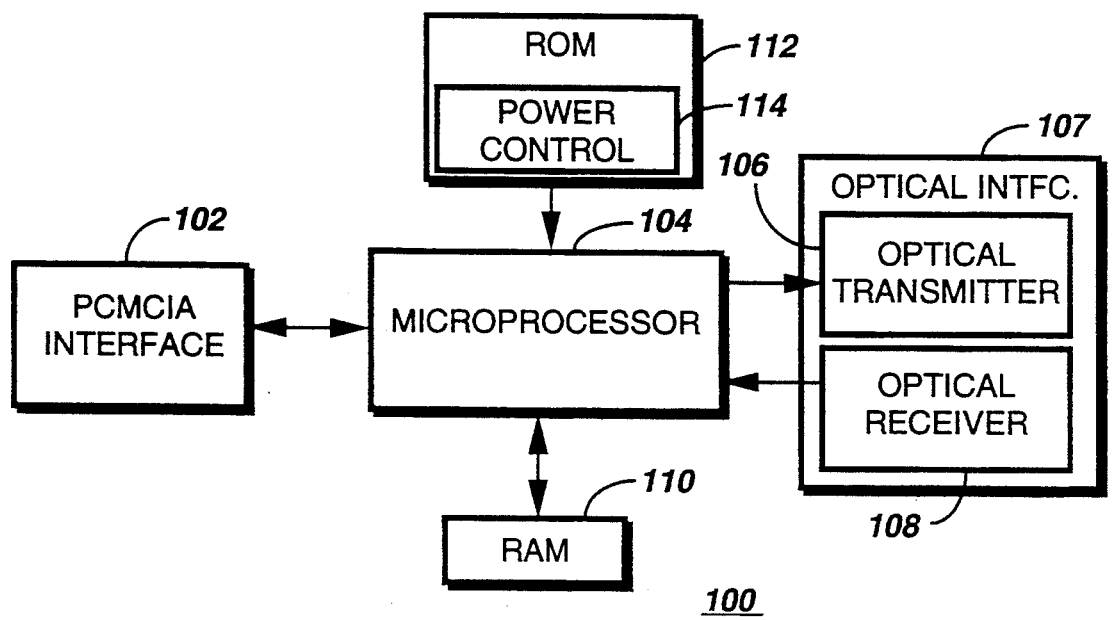
FIG. 1 is an electrical block diagram of a communications adapter in accordance with the preferred embodiment of the present invention.

Referring to FIG. 1, an electrical block diagram of a communications adapter 100 in accordance with the preferred embodiment of the present invention comprises a Personal Computer Memory Card International Association (PCMCIA) interface 102 for communicating with a first external electronic device having a PCMCIA port. Detailed electrical and mechanical specifications of the PCMCIA interface can be found in two documents entitled "PC Card Standard" (Release 2.0), and "Socket Services Interface Specification" (Release 1.01), both documents published by the Personal Computer Memory Card International Association in September, 1991.

The PCMCIA interface is coupled to a microprocessor 104 for controlling and communicating with the PCMCIA interface 102. The microprocessor 104 is preferably one of the MC68HC05C8 or C11 series microcomputers manufactured by Motorola, Inc. of Schaumburg, Ill. The microprocessor 104 is further coupled to an optical interface 107 for communicating with a second external electronic device. The optical interface 107 comprises an optical transmitter 106, such as a conventional light emitting diode (LED), for optically transmitting data; and an optical receiver 108, such as a conventional photo diode, for optically receiving data. Preferably the optical interface 107 transmits and receives using infrared light, although it will be appreciated that light of other frequencies, e.g., visible light, can be used as well.

The microprocessor 104 is also coupled to a random access memory (RAM) 110 for temporarily storing data and operating variables. The microprocessor 104 is further coupled to a read-only memory (ROM) 112 for storing system software. The ROM 112 comprises a power control element 114 for controlling the power consumption of the adapter 100 in response to communication activity. It will be appreciated that other types of non-volatile memory, e.g., programmable ROM (PROM), electrically erasable PROM (EEPROM), and electrically alterable ROM (EAROM), can be substituted for the ROM 112. It will be further appreciated that the microprocessor 104, the ROM 112, the RAM 110, the PCMCIA interface 102, and the optical interface 107 may be integrated in part or in entirety as one or more custom integrated circuits.

Figure 2:
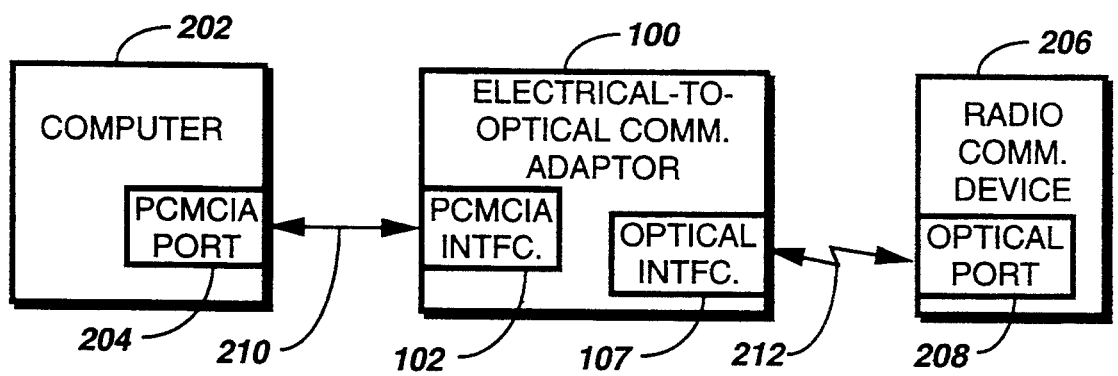
FIG. 2 is an electrical block diagram of a communication system comprising a computer coupled to a radio communication device through the communications adapter in accordance with the preferred embodiment of the present invention.

Referring to FIG. 2, an electrical block diagram of a communication system 200 comprises a computer 202 having a PCMCIA port 204 coupled to a radio communication device 206 through the communications adapter 100 in accordance with the preferred embodiment of the present invention. Preferably, the computer 202 is similar to the HP95LX laptop computer manufactured by Hewlett Packard, Inc. of Palo Alto, Calif., although other computers made by other manufacturers may be used as well for the computer 202. Preferably, the radio communication device 206 is similar to the model A03KLB5962CA ADVISOR ® pager manufactured by Motorola, Inc. of Schaumburg, Ill., modified by the addition of an optical port 208. The optical port 208 comprises a conventional optical transceiver similar to the optical interface 107 and coupled to a microprocessor internal to the pager for communication therewith and control thereby. It will be appreciated that other radio communication devices suitable for receiving data transmissions can be utilized as well.

The PCMCIA port 204 is coupled to the PCMCIA interface 102 by wired interconnections 210, i.e., by connectors that are elements of the PCMCIA port 204 and the PCMCIA interface 102. The optical interface 107 is coupled to the optical port 208 of the radio communication device 206 by light waves 212. By means of the communications adapter 100, the radio communication device 206 advantageously is freed from the requirement of a wired connection to the computer 202 and may be positioned by the user as desired anywhere within optical range of the computer 202.

Figure 3:
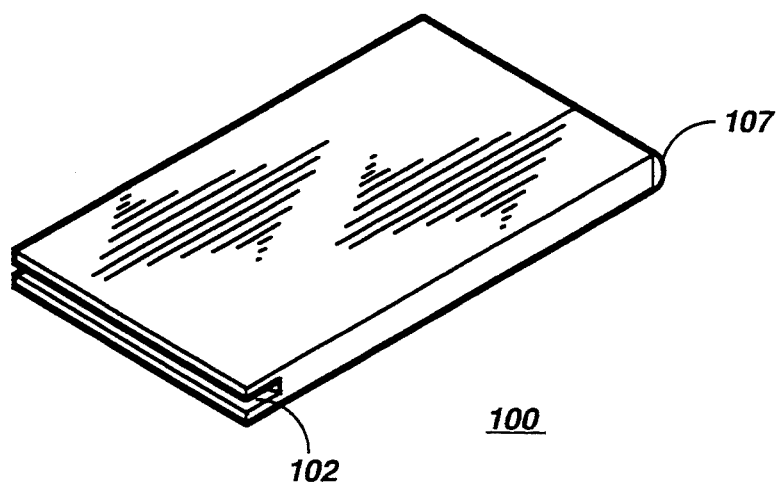
FIG. 3 is an isometric view of the communications adapter in accordance with the preferred embodiment of the present invention.

Referring to FIG. 3, an isometric view of the communications adapter 100 in accordance with the preferred embodiment of the present invention depicts a connector element of the PCMCIA interface 102 and shows the location of the optical interface 107.

Figure 4:
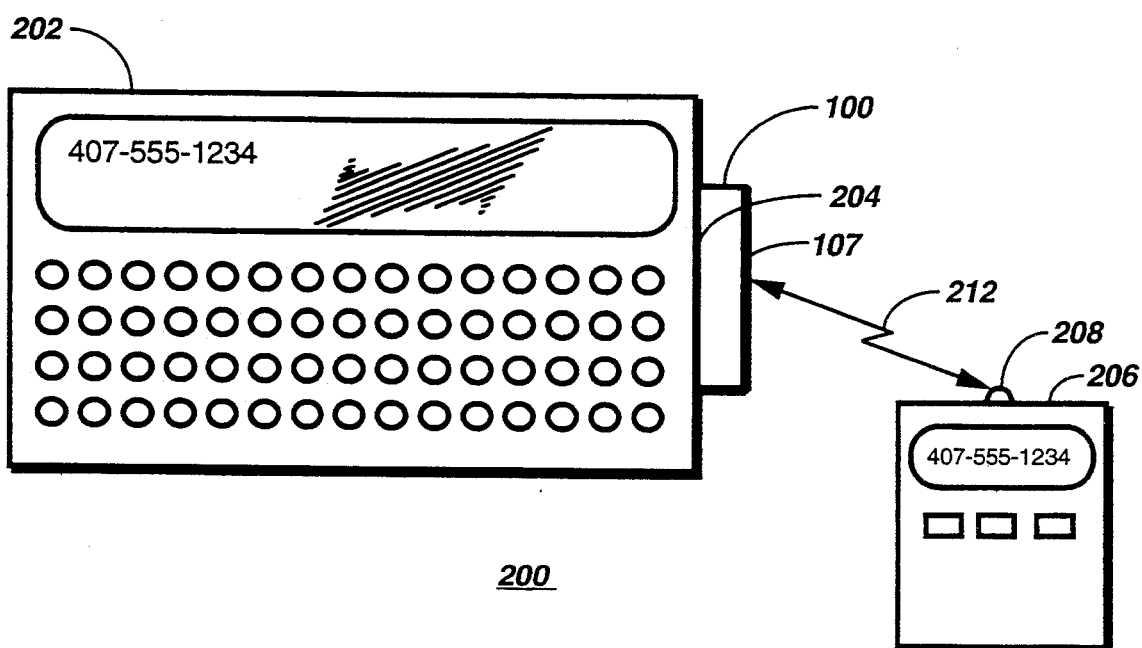
FIG. 4 is a top orthographic view of the communication system comprising a computer coupled to the radio communication device through the communications adapter in accordance with the preferred embodiment of the present invention.

Referring to FIG. 4, a top orthographic view of the communication system 200 in accordance with the preferred embodiment of the present invention depicts the position of the communications adapter 100 when plugged into the PCMCIA port 204 of the computer 202. The optical port 208 of the radio communication device 206 is coupled to the optical interface 107 of the communications adapter 100 by the light waves 212, and thence to the PCMCIA port of the computer 202 for communicating data between the radio communication device 206 and the computer 202. This arrangement advantageously allows the radio communication device 206 to communicate with any computer 202 having the industry-standard PCMCIA port 204, regardless of the manufacturer of the computer 202.

Figure 5:
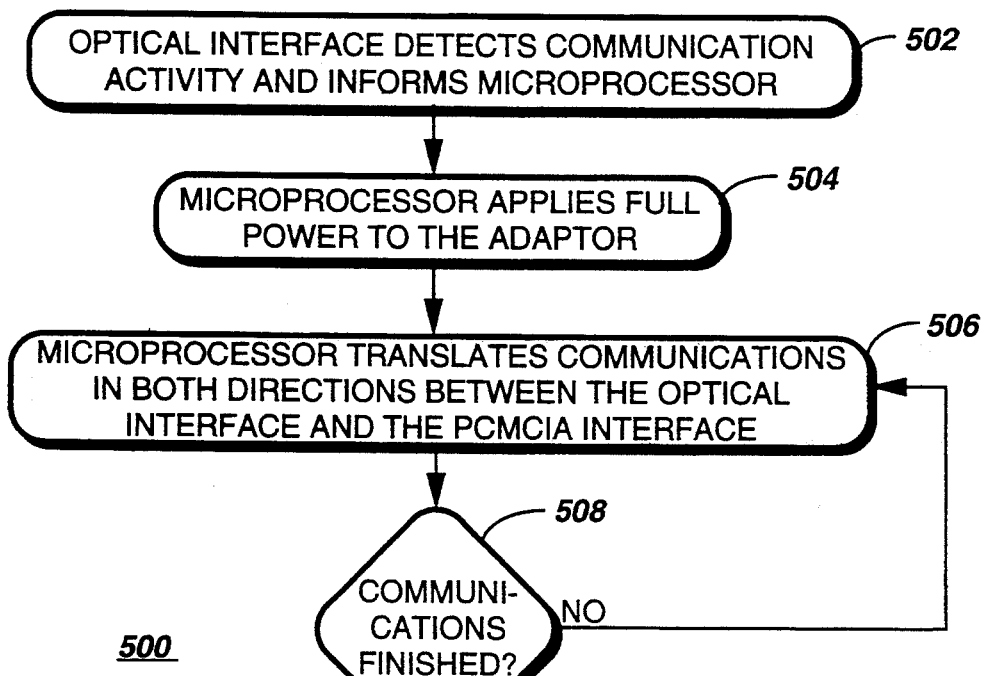
FIG. 5 is a flow chart depicting operation of the communications adapter in response to optically originated communications in accordance with the preferred embodiment of the present invention.

Referring to FIG. 5, a flow chart 500 depicting operation of the communications adapter 100 in response to optically originated communications in accordance with the preferred embodiment of the present invention begins with the optical interface 107 detecting 502 communication activity by the radio communication device 206 and informing the microprocessor 104. In response, the microprocessor 104 accesses the power control element 114 stored in the ROM 112 and applies 504 full power to the communications adapter 100. Applying full power may include such activities as applying power to the optical transmitter 106 and switching a clock rate used by the microprocessor 104 from a slow "sleep mode" to a fast "operate mode."

Next, the microprocessor 104 translates 506 the communications between the optical interface 107 and the PCMCIA interface 102, and vice versa. The translations include conversions between the serial format of the optical interface 107 and the parallel format of the PCMCIA interface 102, as well as any protocol conversions required for functional compatibility. In step 508 the microprocessor 104 monitors the communications to determine whether the communications have finished. If not, the flow returns to step 506, where the microprocessor 104 continues to translate the communications. When the communications have finished, flow moves to step 510, where the microprocessor 104 restores 510 the power consumption of the communications adapter 100 to a low power level.

Figure 6:
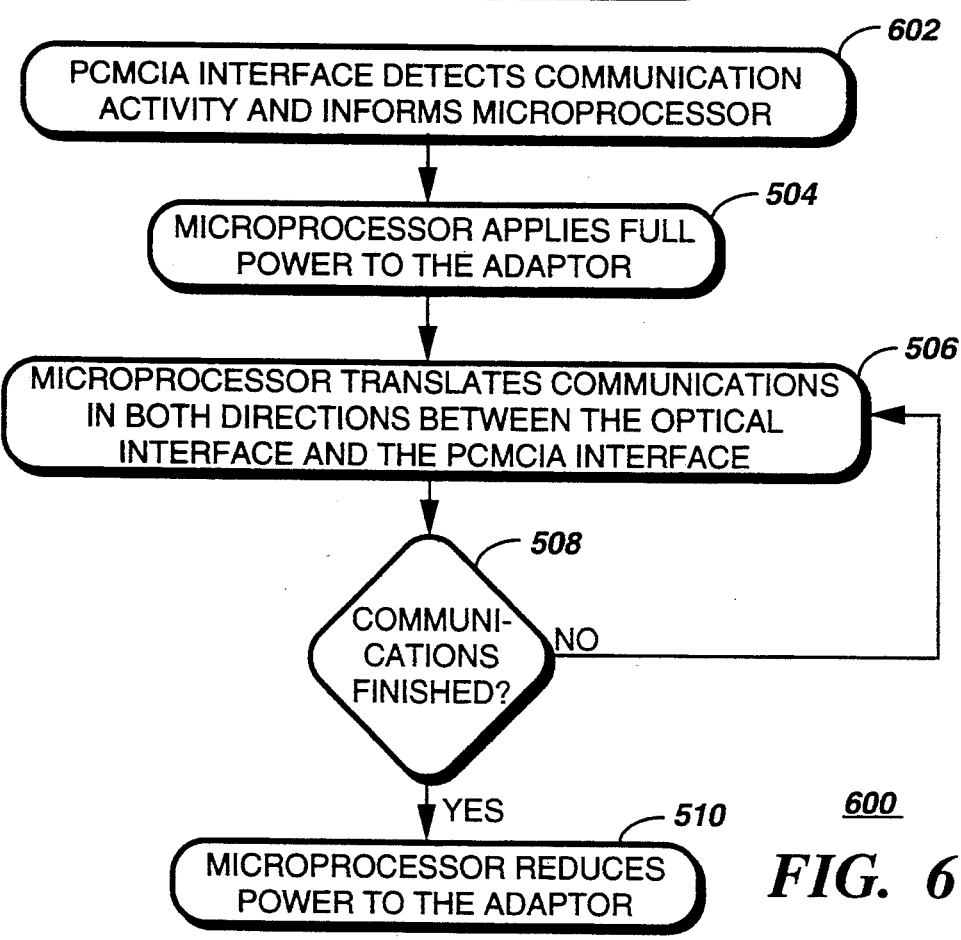
FIG. 6 is a flow chart depicting operation of the communications adapter in response to electrically originated communications in accordance with the preferred embodiment of the present invention.

Referring to FIG. 6, a flow chart 600 depicting operation of the communications adapter 100 in response to electrically originated communications in accordance with the preferred embodiment of the present invention is depicted. The essential difference between the flow chart 500 and the flow chart 600 is that the flow chart 600 is entered when the PCMCIA interface 102 detects 602 communication activity by the computer 202 and informs the microprocessor 104. The remaining steps 504–510 of the flow chart 600 are identical to the steps 504–510 of the flow chart 500.

Thus, the preferred embodiment of the present invention advantageously provides a communications adapter for adapting a PCMCIA port to an optical communications port. The preferred embodiment of the present invention provides an industry standardized interface that supports optical communications, thereby enabling the placement advantages derived from the elimination of wired connections, while maintaining interoperability among devices made by different manufacturers.

What is claimed is:

1. An apparatus for coupling first and second electronic devices, the first electronic device having an optical communications port and the second electronic device having an electrical communications port, the apparatus comprising:
   an electrical interface functionally compatible with the electrical communications port;
   an optical interface functionally compatible with the optical communications port and electrically coupled to said electrical interface for communicating with said electrical interface; and
   a power control element coupled to said electrical interface and to said optical interface,
   wherein said electrical interface and said optical interface provide communications between the electrical communications port and the optical communications port when said electrical interface is electrically coupled to the electrical communications port, and said optical interface is optically coupled to the optical communications port, and
   Wherein said power control element reduces power consumption by the apparatus in response to an absence of communications activity in said electrical interface and in said optical interface, and
   wherein said power control element restores full functional power to the apparatus in response to communications activity in at least one of said electrical interface and said optical interface.

2. The apparatus according to claim 1, wherein said electrical interface is a Personal Computer Memory Card International Association (PCMCIA) interface.

3. The apparatus according to claim 1, wherein said optical interface comprises an infrared receiver.

4. The apparatus according to claim 1, wherein said optical interface comprises an infrared transmitter.

5. The apparatus according to claim 1, further comprising a processor coupled to said electrical interface and to said optical interface for performing communication translation therebetween.

6. An apparatus for coupling first and second electronic devices, the first electronic device having an optical communications port and the second electronic device having a Personal Computer Memory Card International Association (PCMCIA) port, the apparatus comprising:
   a PCMCIA interface functionally compatible with the PCMCIA port;
   an optical interface functionally compatible with the optical communications port and electrically coupled to said PCMCIA interface for communicating with said PCMCIA interface; and
   a power control element coupled to said PCMCIA interface and to said optical interface,
   wherein said PCMCIA interface and said optical interface provide communications between the PCMCIA port and the optical communications port when said PCMCIA interface is electrically coupled to the PCMCIA port, and said optical interface is optically coupled to the optical communications port, and
   wherein said power control element reduces power consumption by the apparatus in response to an absence of communications activity in said PCMCIA interface and in said optical interface, and
   wherein said power control element restores full functional power to the apparatus in response to communications activity in at least one of said PCMCIA interface and said optical interface.

7. The apparatus according to claim 6, wherein said optical interface comprises an infrared receiver.

8. The apparatus according to claim 6, wherein said optical interface comprises an infrared transmitter.

9. The apparatus according to claim 6, further comprising a processor coupled to said PCMCIA interface and to said optical interface for performing communication translation therebetween.

10. An adapter for coupling a radio communication device and a computer, the radio communication device having an optical communications port and the computer having a Personal Computer Memory Card International Association (PCMCIA) port, the adapter comprising:
- a PCMCIA interface functionally compatible with the PCMCIA port;
- an optical transceiver functionally compatible with the optical communications port and electrically coupled to said PCMCIA interface for communicating with said PCMCIA interface; and
- a power control element coupled to said PCMCIA interface and to said optical transceiver,
- wherein said PCMCIA interface and said optical transceiver provide communications between the PCMCIA port and the optical communications port when said PCMCIA interface is electrically coupled to the PCMCIA port, and said optical transceiver is optically coupled to the optical communications port, and
- wherein said power control element reduces power consumption by the adapter in response to an absence of communications activity in said PCMCIA interface and in said optical transceiver, and
- wherein said power control element restores full functional power to the adapter in response to communications activity in at least one of said PCMCIA interface and said optical transceiver.

11. The adapter according to claim 10, wherein said optical transceiver comprises an infrared device.

12. The adapter according to claim 10, further comprising a processor coupled to said PCMCIA interface and to said optical transceiver for performing communication translation therebetween.

13. A communication system, comprising:
- a first electronic device having an optical communications port;
- a second electronic device having an electrical communications port; and
- an apparatus for coupling said first and second electronic devices, said apparatus comprising:
  - an electrical interface functionally compatible with the electrical communications port;
  - an optical interface functionally compatible with the optical communications port and electrically coupled to said electrical interface for communicating with said electrical interface; and
  - a power control element coupled to said electrical interface and to said optical interface,
    - wherein said electrical interface and said optical interface provide communications between the electrical communications port and the optical communications port when said electrical interface is electrically coupled to the electrical communications port, and said optical interface is optically coupled to the optical communications port, and
  - wherein said power control element reduces power consumption by said apparatus in response to an absence of communications activity in said electrical interface and in said optical interface, and
  - wherein said power control element restores full functional power to said apparatus in response to communications activity in at least one of said electrical interface and said optical interface.

14. The communication system according to claim 13, wherein said first electronic device is a radio communication receiver for receiving data communications.

15. The communication system according to claim 13, wherein said second electronic device is a computer.

16. The communication system according to claim 13, wherein said electrical interface is a Personal Computer Memory Card International Association (PCMCIA) interface.

17. The communication system according to claim 13, wherein said optical interface comprises an infrared transceiver.

18. The communication system according to claim 13, further comprising a processor coupled to said electrical interface and to said optical interface for performing communication translation therebetween.

* * * * *